P. C. HEWITT.
HELICOPTER.
APPLICATION FILED JUNE 14, 1919.

1,350,455.

Patented Aug. 24, 1920.
7 SHEETS—SHEET 5.

INVENTOR
Peter Cooper Hewitt,
BY
Kenyon & Kenyon
his ATTORNEYS

UNITED STATES PATENT OFFICE.

PETER COOPER HEWITT, OF RINGWOOD MANOR, NEW JERSEY.

HELICOPTER.

1,350,455.   Specification of Letters Patent.   Patented Aug. 24, 1920.

Application filed June 14, 1919. Serial No. 304,188.

*To all whom it may concern:*

Be it known that I, PETER COOPER HEWITT, a citizen of the United States, and a resident of Ringwood Manor, Passaic county, and State of New Jersey, have invented certain new and useful Improvements in Helicopters, of which the following is a specification.

My invention relates to helicopters: and the principal object of the invention is to provide a helicopter of practical commercial construction.

In other applications filed on even date herewith I have disclosed and claimed certain broad and fundamental helicopter features invented by me, and certain improvements made by me in the construction of helicopters. In this application I show and claim certain other improvements in construction relative primarily to the lifting propellers and their mounting.

In the accompanying drawings forming a part of this specification and illustrating one embodiment of my invention.

Figure 1:
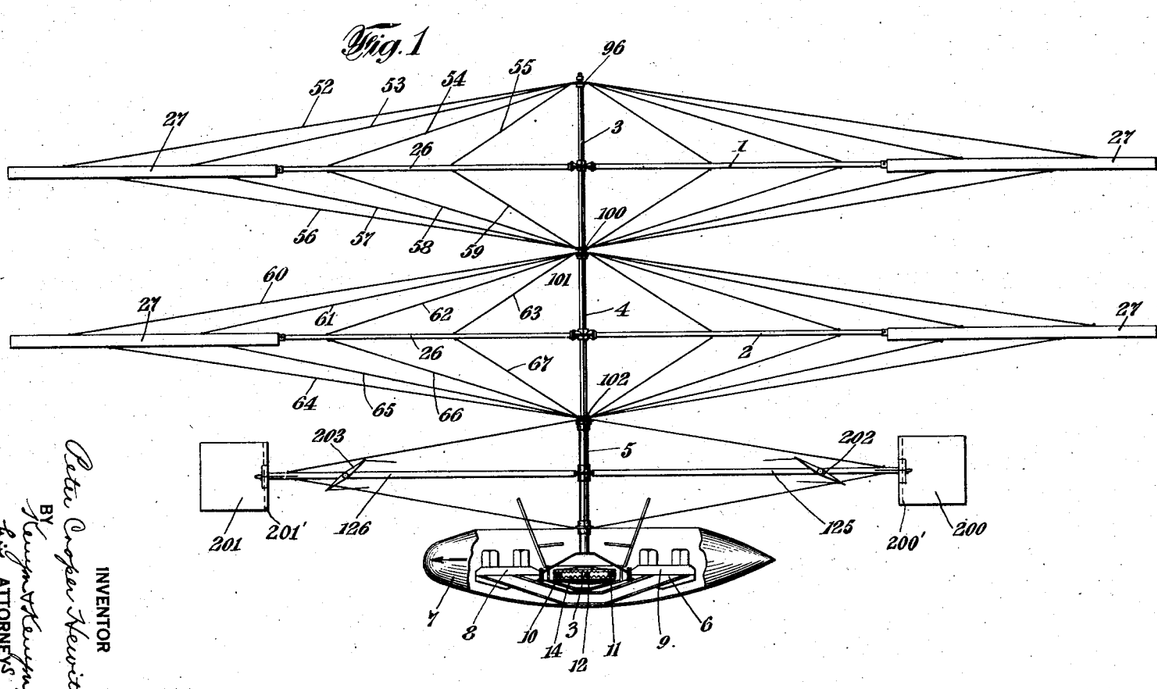
Figure 1 is a side elevation of the said embodiment of the invention, part of the fuselage or car being broken away.
Figure 2:
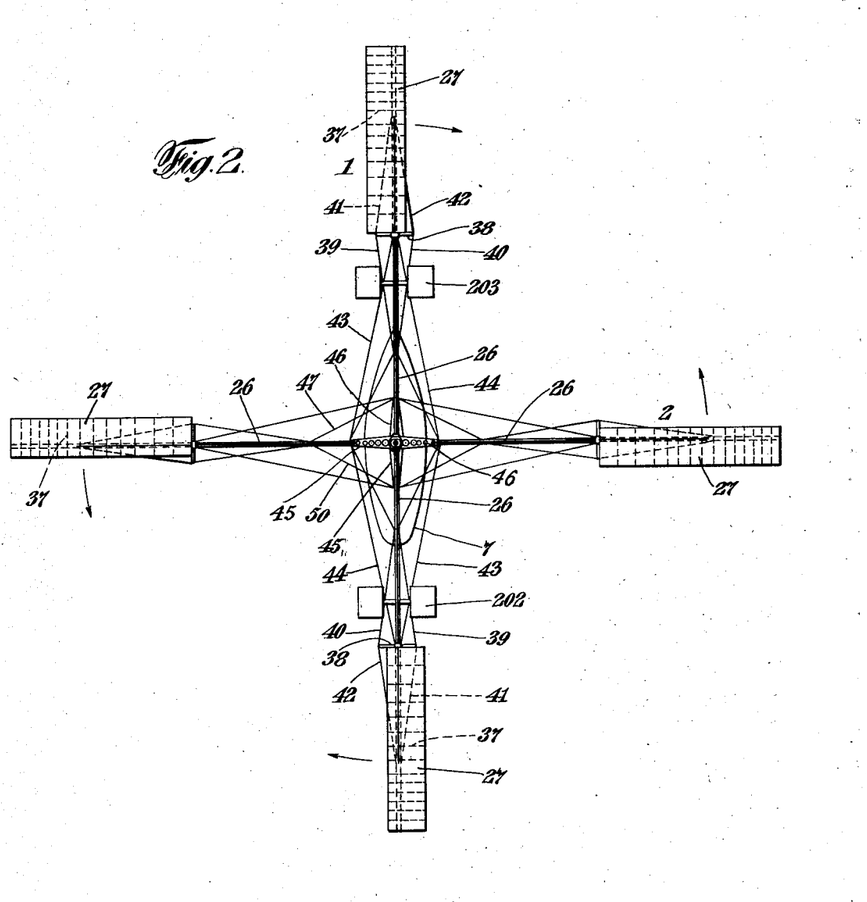
Fig. 2 is a top plan view thereof.
Figure 3:
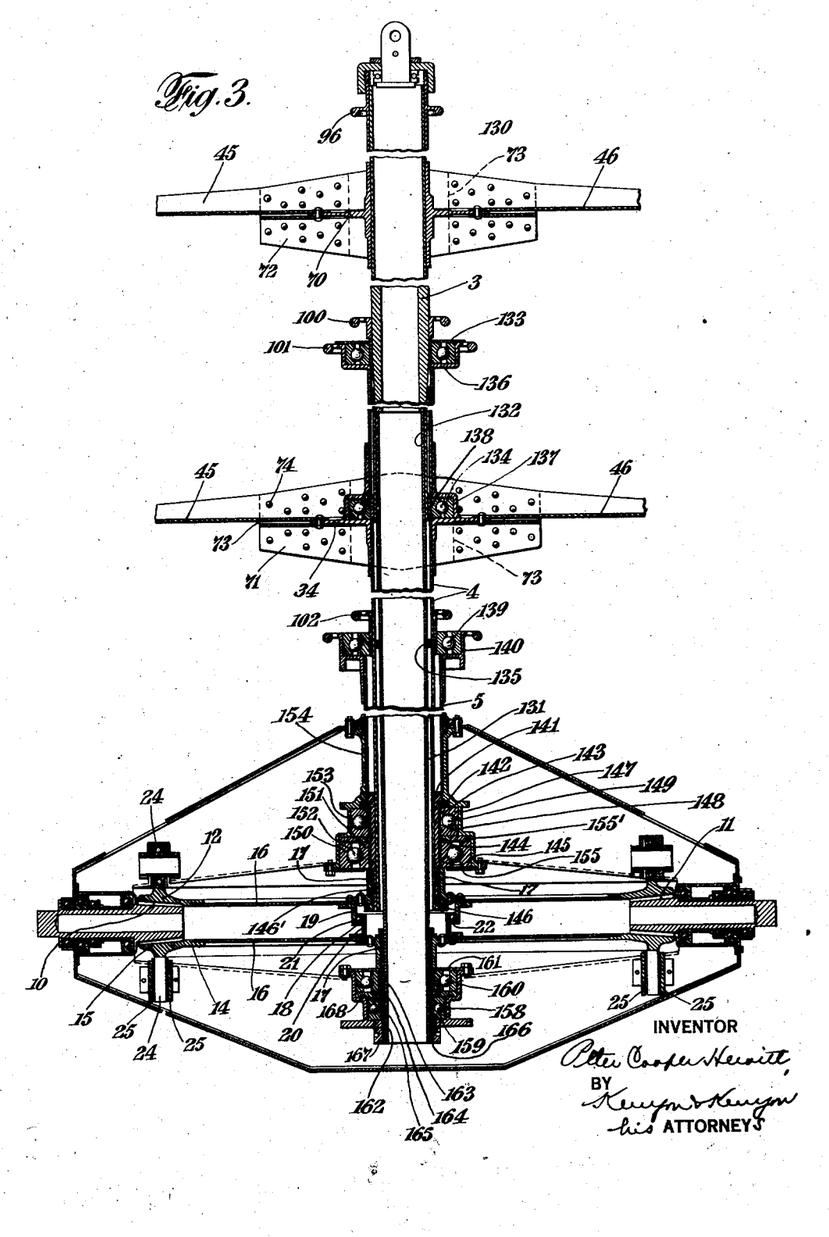
Fig. 3 is a vertical sectional view through the vertical propeller shafts, parts of the shafts being broken away.

The helicopter shown comprises an upper propeller 1 and a propeller 2 below the same, the propeller 1 being carried by a normally vertical shaft 3, which passes through the tubular shaft 4 of the propeller 2. The shaft 4 extends through a tubular bearing 5 forming a part of the frame 6 of the machine and stationary with respect thereto. This frame carries the fuselage or car 7. The shafts 3 and 4 are driven in opposite directions by motors or engines 8 and 9 arranged one to the front and the other to the rear of the shafts 3 and 4 and having their driving shafts in axial alinement longitudinally of the fuselage 7, the axis of said driving shafts intersecting the axis of the shafts 3 and 4 at right angles.

The shaft of the engine or motor 8 is provided with a beveled pinion 10, and the shaft of the motor 9 with a beveled pinion 11. Each of these pinions meshes with a larger beveled gear 12 secured to the shaft 4 above the pinion, and also with a beveled gear 14 secured to the shaft 3 below the pinion and of the same diameter as gear 12.

The arrangement shown is such that a balanced action is obtained in driving the shafts 3 and 4, and there is substantially no thrust on the various bearings, inasmuch as each moving part of the mechanism is acted upon by equal forces acting in opposite directions. Each of the gears 12 and 14, for example, is acted upon on one side of its axis by the gear 10, tending to drive the same in one direction, for example, forwardly referring to Fig. 1, while on the other side of its axis it is acted upon by the gear 11, tending to drive the same in the opposite direction, or rearwardly in the case assumed. In other words, with the motors giving equal powers a true dynamic couple is obtained, causing rotation without lateral thrust upon the bearings.

While I have shown the driving means for the shafts 3 and 4 in this application, I have claimed the same *per se* in another application filed on even date herewith, and I shall not describe the same in detail in this application. Briefly stated, however, each of the gears 12 and 14 is formed with a rigid ring portion 15 engaging the pinions 10 and 11, the ring portion 15 being supported by a flexible plate 16, which, at its inner end, is secured to a hub 17. The said gears are securely maintained in coaxial relation by suitable means, such as the ball bearing 18, which, as shown, comprises a runway 19 extending downwardly from the gear 12, a runway 20 extending upwardly from the gear 14, and balls or anti-friction members 21 arranged between said runways and held properly spaced, as by a ring 22. The flexibly mounted gears 12 and 14 are held securely in mesh with the pinions 10 and 11 by rollers 24, supported, as by means of straps 25, from the frame of the machine and bearing upon the outer faces of the gears 12 and 14.

As shown, each of the propellers is provided with two arms 26 in alinement with each other, each of these arms carrying a blade 27.

Figure 12:
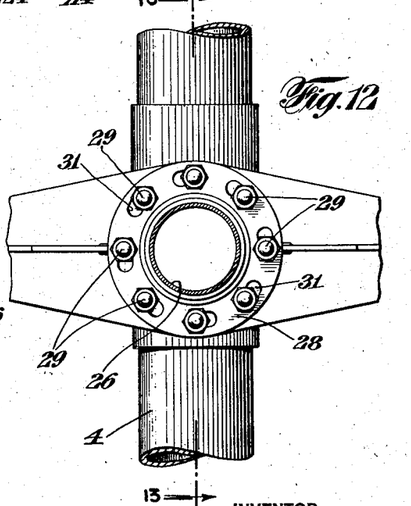
Fig. 12 is an elevation illustrating the mounting of the propeller arms upon the propeller shafts.
Figure 13:
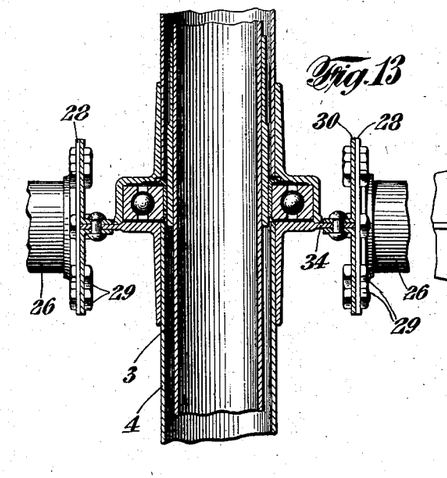
Fig. 13 is a central vertical sectional view taken on line 13—13 of Fig. 12.

Referring to Figs. 12 and 13, the tubular arms 26 are mounted for movement about their longitudinal axes to permit variation of the pitch angle of the propeller blades. Each arm 26 is provided at its inner end with a circular flange 28, which is secured, as by the bolts 29, to a vertical disk-like flange 30 projecting from a flange on the corresponding propeller shaft. The bolts, as shown, extend through openings in the flanges 28 and 30, the openings in the flange 28 being elongated, as shown at 31, with their longitudinal center lines extending as a circular arc about the axis of the arm 26. It is evident that, by loosening the bolts 29, each arm 26 may be rotated about its axis within a limited extent as permitted by the slots 31 to change the pitch angle of the corresponding blade, whereupon, by tightening the bolts 29, the arm and blade may be secured in the adjusted position. It is understood that each of the propeller arms of both propellers and the blades carried by the arms, may be adjusted as described to vary the pitch angle of the blade.

I shall now describe the means for holding the arms 26 and the blades 27 in their proper relation to the propeller shafts. Each of the arms 26 extends into the corresponding blade 27 substantially from the inner end to the outer end thereof. The blade is held in proper relation to this arm by cross braces or ribs 37, which will be described more fully hereinafter. Each arm 26 is provided, adjacent the inner edge of the corresponding blade, with a cross-arm 38, which extends on both sides of the arm 26 at substantially the same angle to the horizontal as the blade 27. The outer ends of the cross-arm 38 are connected by guy wires or tension members 39 and 40, respectively, with the tubular arm 26 at a point between the axis of the propellers and the cross arm, and by wires or tension members 41 and 42 to the arm 26 near the outer end of the propeller blade, preferably at such a point that the drag on the propeller blade outwardly of the point will be equal the drag on the propeller blade inwardly of the said point toward the axis of the propeller. With this construction, it will be seen that the arms or compression members 26 and 38, together with the wires or tension members 39, 40, 41 and 42, form a truss which is rigid horizontally or in the plane in which the corresponding propeller blade moves through the air during its rotation.

The arms 26 and the parts carried thereby are retained securely in position with respect to the propeller shafts and rotated by means including wires or tension members 43 and 44, which are secured at their inner ends to horizontal rigid arms 45 and 46, respectively. These arms are secured to the propeller shaft and extend radially therefrom in opposite directions and at right angles to the arms 26. The outer ends of the wires 43 and 44 are secured to the arm 26 at a point adjacent to the inner edge of the propeller blade. A wire or tension member 47 connects the outer end of the arm 46 with the arm 26 adjacent the inner ends of the wires 39 and 40; and a wire or tension 50 connects the outer end of the arm 45 with the arm 26 at the same point in the length of the arm 26.

As more clearly shown in Fig. 1, each arm 26 of the upper propeller and the corresponding blade 27 are connected by guy wires or tension members 52, 53, 54 and 55 with the upper end of the shaft 3, and by means of guy wires or tension members 56, 57, 58 and 59 with said shaft at a point below the arm 26 and propeller blade. The guy wires 52, 53, 54, 55, 56, 57, 58 and 59 transmit the upward lift or downward thrust to the propeller shafts and maintain the propeller blades and their supporting arms in proper relation vertically with respect to the propeller shafts.

The construction which has been described for supporting the arm 26 and propeller blade and holding the same in proper relation to the supporting shaft is the same for both arms 26 and blades 27 of each propeller, and is symmetrical on both sides of the axis of the arms 45 and 46.

Guy wires 60, 61, 62, 63, 64, 65, 66 and 67, for holding the propeller blades and their supporting arms of the lower propellers in a position with respect to the shaft 4, are fastened to the tubular shaft 4, the wires 60, 61, 62 and 63 being secured to the shaft 4 adjacent the upper end thereof and above the arms 26, and the wires 64, 65, 66 and 67 to the shaft 4 below the arm 26. The guy wires referred to for taking care of the vertical force upon the propeller blades and arms, are connected to the arms 26 of the propeller blades at spaced points, the outermost guy wires being connected to the arms, as shown, in proximity to the outer ends of the blades.

As the wires 43, 44, 47 and 50 are located entirely exteriorly of the blade 41, they do not interfere with the rotation of the blade when the pitch angle thereof is changed. The wires 41, 42, 39 and 40 rotate with the blade.

Referring to Fig. 3, it will be seen that the arms 45 and 46 are channel-shaped; and, as these arms are of substantial breadth, they are rigid horizontally or in the direction in which the tension is applied thereto by the guy wires, their rigidity in this direction being considerably greater than that of the arms 26. The arms 45 and 46 are secured to the flanges 34 and 70 upon the shafts 4 and 3, respectively, in any suitable manner. As shown, inverted channel-shaped brackets 71 and 72 are arranged under the flanges 70 and 34, respectively, and rivets are passed through each arm, which is arranged above the flange, and the corresponding flange and bracket. The side flanges of each arm and the corresponding bracket may be secured together by gusset-plates 73, as by means of rivets 74. It will be seen that the blade-supporting arms 26 are pulled or drawn around the axis of rotation of the propellers by means of the arms 45 and 46 and the forward wires connecting the same with the arms 26.

Figures 4, 6:
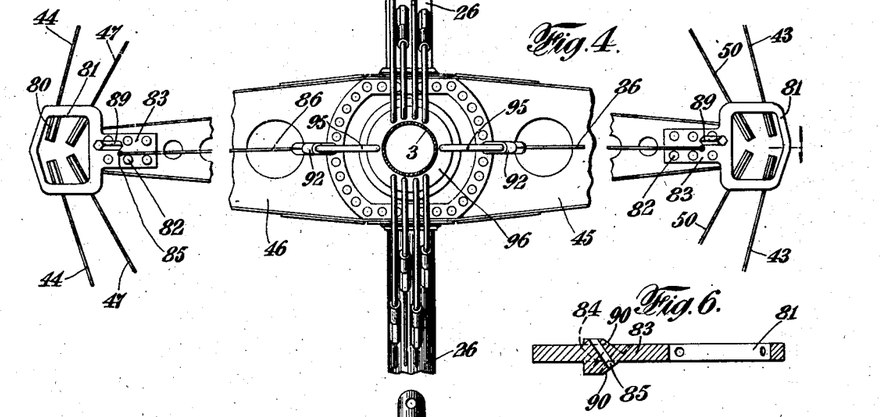
Fig. 4 is a detailed plan view partly broken away, showing means for anchoring the guy wires forming part of the propellers.
Fig. 6 is a detailed sectional view of one of the wire anchors.
Figure 5:
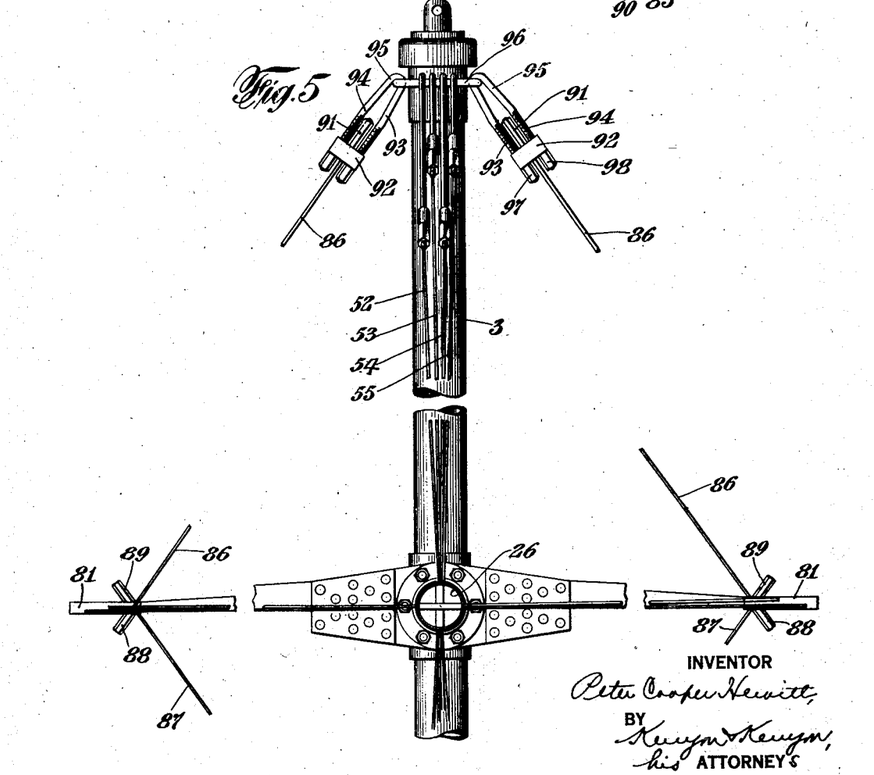
Fig. 5 is a side elevation of the parts shown in Fig. 4.

The arms 45 and 46 with their connections, are shown in detail in Figs. 4 and 5. Referring to the said figures, the wires 44 and 47 are connected to the arm 46 and the wires 43 and 50 to the arm 45 by means of nuts 80 threaded on the ends of the respective wires and bearing at their inner ends against the inner surface of a loop 81 secured to the outer end of the arm, as by rivets 82. One of these loops is secured at the end of each of the arms. The loops are provided with shanks 83, by which they are secured to the arms. These shanks are provided with openings 84 and 85 for wires 86 and 87, which extend from points on the corresponding propeller shaft respectively above and below the arms 45 and 46. The ends of the wires 86 and 87 adjacent the said arms are provided with nuts 88 and 89, respectively, which bear against the shank 83. As shown in Fig. 6, the part 83 is provided with inclined surfaces 90 against which the nuts 88 and 89 rest in alinement with the respective wires. The wires by which the propeller arms and blades, as well as the arms 45 and 46, are retained in proper relation vertically to the propeller shaft are secured to the said shaft by means permitting tensioning of the wires without twisting the same.

Referring to Figs. 4 and 5, the wires 52, 53, 54, 55 and 86 are provided at their upper ends with nuts 91, which bear upon the upper faces of bridge members 92 movable longitudinally upon the arms 93 and 94 of staples 95. The wires pass freely through these bridge members and are free to rotate with respect thereto before the wires are tightened. The staples for the upper wires pass through openings in a circular flange 96 projecting from the upper end of the shaft 3. The bridge 92 is movable upwardly along the arms 93 and 94 to move the nut 91 in the same direction and to tension the wire by means of nuts 97 and 98 threaded upon the lower ends of the arms 93 and 94, respectively. By adjustment of the nuts 97 and 98, therefore, the wire connected to the bridge 92 by the nut 91 can be adjusted to any tension without weakening by twisting or turning thereof. The wires 56, 57, 58 and 59, as well as the wire 87, are connected in a like manner to a flange 100 on shaft 3 (see Figs. 1 and 3). The wires 60, 61, 62, and 63, as well as the upper wires connecting the outer ends of the lower arms 45 and 46 to the shaft 4, are connected in the same manner to a flange 101 on shaft 4 (see Figs. 1 and 3); and the wires 64, 65, 66 and 67, as well as the lower wires connecting the lower arms 45 and 46 with the shaft 4, are connected in the same manner to a circular flange 102 upon the shaft 4 (see Figs. 1 and 3).

The means for securing the various wires to the arms 26 are shown in detail in Figs. 7 to 11, inclusive.

Figure 7:
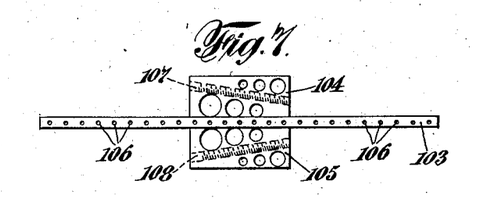
Figs. 7 and 8 are, respectively, side and end views of another wire anchor.
Figure 8:
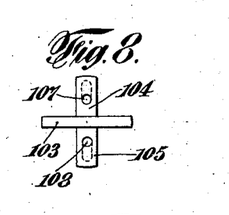
Figure 15:
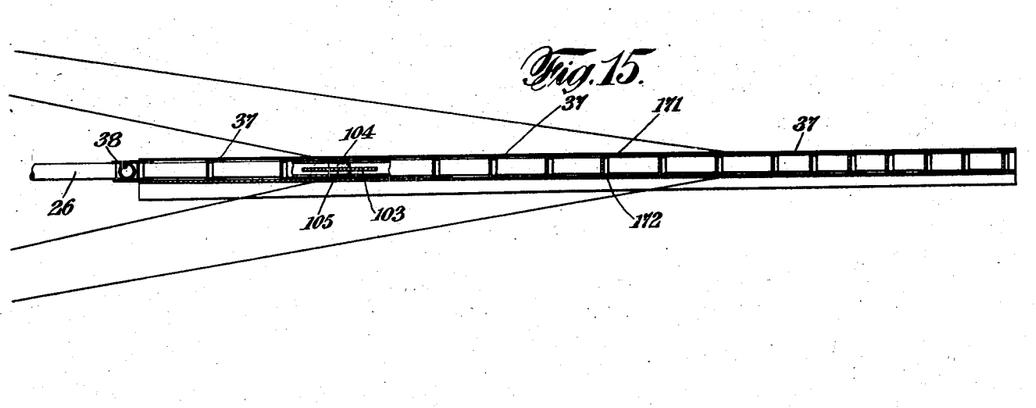
Fig. 15 is a vertical section taken through the axis of arm 26 in Fig. 14.

Referring to Figs. 7 and 8, the means shown in these figures are employed where two wires from opposite directions are to be secured to one of the arms 26, as for example at a point where the wires 53 and 57 are connected to the arm 26. The device shown in these figures is substantially in the nature of a flat plate 103, the width of which is equal to the internal diameter of the tubular arm 26. This plate-like member is provided substantially midway between the length thereof and midway between the lateral edges thereof with lugs 104 and 105 projecting from opposite faces thereof, the distance between the outer edges of the lugs 104 and 105 being equal to the internal diameter of the arm 26. The outer edges of the lugs 104 and 105 and the longitudinal edges of the body part of the member 103 are slightly curved, so that the device is adapted to fit tightly within one of the arms 26 with the said curved edges in engagement with the inner surface of the said arms (see Fig. 15). The said device, which constitutes an anchor block for the wires, is held in place by pins which are driven into openings in the tubular arm and into the openings 106 along the longitudinal edge portions of the flat body part of the anchor block. As shown, the flat body part 103 is of considerable length and there are a large number of openings 106, so that the pull of the wires upon the anchor block is distributed over a considerable portion of the arm 26, and there are accordingly no excessive local loads tending to tear said tubes and thus cause a loosening of the wires. The wires to be fastened to the anchor blocks are threaded into openings 107 and 108 in the said blocks.

Figure 9:
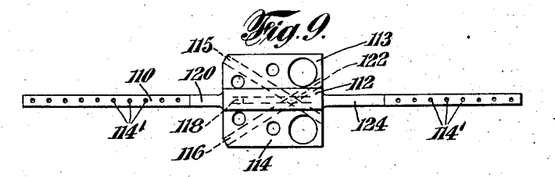
Figs. 9, 10 and 11 are, respectively, side, end and top views of still another wire anchor.
Figure 10:
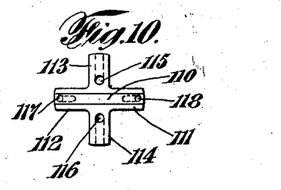
Figure 11:
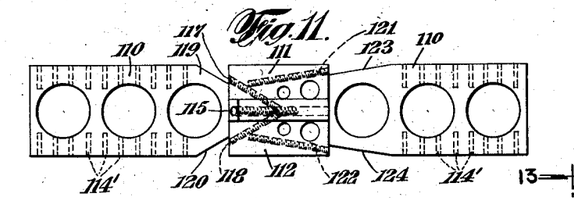

In Figs. 9, 10 and 11, I have shown an anchor block for securing four substantially horizontal wires and two wires arranged in vertical planes to one of the arms 26. The anchor block in question is provided with a body portion 110, with lugs 111 and 112 extending in the same direction as the body part and with lugs 113 and 114 extending at right angles to the lugs 111 and 112. The lugs 111, 112, 113 and 114 are thicker than the body part 110 and are arranged midway between the ends of the anchor block. The latter is adapted to be secured in position similarly to the block shown in Figs. 7 and 8, by means of pins passing through the wall of the arm 26 and into openings 114' in the anchor block, the longitudinal edges of the block and the outer edges of the lugs 111, 112, 113 and 114 engaging the inner surface of the tubular arm 26. The lugs 113 and 114 are provided, respectively, with threaded openings 115 and 116, into which two of the wires, such as the wires 55 and 59, are threaded. Extending into the lugs 111 and 112, respectively, from one end thereof are threaded openings 117 and 118, respectively, into which are threaded two wires coming from one side of the anchor, such as the wires 47 and 50. The body part of the anchor block is cut away, as shown at 119 and 120, to permit the said wires to pass freely to said openings. The lugs 111 and 112 are also provided with threaded openings 121 and 122 extending into the same from the opposite end from that at which the openings 117 and 118 enter. Into these openings are threaded the wires 39 and 40, respectively. The anchor block is cut away, as shown at 123 and 124, to permit said wires to pass freely to said openings. The tubular arms 26 are perforated to permit the passage of the wires to the respective anchor blocks.

The propellers constructed as described may be made of very large diameter. I have constructed a machine having a lift of 2,550 pounds, with horse power of 126.5, the propellers being 51 feet in diameter. By further refinements in the propeller, and the other parts of the machine, I estimate that the propeller diameter for this machine may be decreased to about 42 ft. with a probable loss in efficiency in lift per horse power but it would still be practically operative. The machine as constructed is capable of giving a total lift of about 4,000 pounds.

The lower frame 6 may be composed of tubular arms 125 and 126, connected at their inner ends to the tube 5, and these arms 125 and 126 may be connected to the tubular support 5 by guy wires, as shown.

Referring to Fig. 3, I shall now describe the mounting of the propeller shafts 3 and 4. The shaft 3 extends through the shaft 4 and both of these shafts pass through the tubular bearing 5. The propeller 1 is mounted upon the upper end of the shaft 3 and the gear 14 upon the lower end thereof. This shaft, as shown, is formed of an upper section 130, which is connected to a lower section 131, as shown at 132, the lower section extending into and being secured, as by brazing, to the upper section. The upper section of the shaft 3 is, as shown, of increased strength by reason of its increased thickness at a point adjacent the flanges 100 and 101,—that is, in the vicinity of a point between the upper and lower propellers or at the upper end of the outer propeller shaft. The reason for this increased strength is that, when the machine is inclined to produce lateral flight, in a manner well understood in connection with machines of this type, there is a large bending stress upon the shaft at the point in question for the following reason. During such inclination the pitch of a blade on one side of each propeller is correspondingly increased and the pitch of a blade on the opposite side of the same propeller correspondingly decreased. The other propeller, which is running in the opposite direction and has its blades inclined in opposite directions from those of the first propeller, will, upon inclination of the machine, have its blade of increased pitch upon the same side of the machine as the blade of decreased pitch of the other propeller, and the blade of decreased pitch on the same side of the machine as the blade of increased pitch of the other propeller. The result is that the upward thrust on each of the propellers is greater on one side of the machine than the other, and the greater thrust of one propeller is on the side of the machine opposite that of the greater thrust of the other propeller. As a consequence, there is a tendency to bend the axis of rotation of the two propellers about a point between the propellers. This bending produces a stress tending, especially with large propellers to strain or break the shaft of the upper propeller which extends into and through the shaft of the lower propeller. It is to take care of this stress that the inner shaft 3 is strengthened at the point in question. Desirably, the thickness of the wall of said shaft is gradually increased toward the said point from a considerable distance on each side of the said point, for example, from the centers of the respective propellers.

The shafts 3 and 4 are held in coaxial relation by suitable means, such as ball or anti-friction bearings 133, 134 and 135. These ball bearings may be of well known construction, comprising an outer and inner ball race with a plurality of balls between them. The bearing 133 is arranged at the upper end of the shaft 4 and is inclosed within a casing 136, with which the flange 101, as shown, is formed integrally. The casing 136 may be brazed or otherwise secured to the shaft 4. The bearing 134 is inclosed within a casing 137, which is brazed or otherwise secured to the shaft 4, the casing coöperating with the flange 34 to inclose the said bearing. A collar or sleeve 138 is placed between the inner ball race and the inner shaft 3. The bearing 135 is placed between the shafts 3 and 4 at substantially the height of the anti-friction bearing 139 between the tubular support 5 and the shaft 4. The bearing 139 may also consist of an ordinary ball bearing having an outer and an inner ball race with balls between the same. This bearing is shown as supported in a casing 140, which is brazed or otherwise secured to the tubular member 5. These various bearings tend to materially strengthen the shafts 3 and 4.

The lower ends of the shafts 3 and 4 are held in coaxial relation to each other and to the member 5 and the supporting frame of which said member is a part, by suitable anti-friction bearings; and suitable anti-friction bearings are also provided to transmit either the lift or the weight of the propellers to the supporting frame. To this end the shaft 4 has secured thereon, as by brazing, a sleeve 141, on which are mounted, in the order named, a collar 142, a sleeve 143, a second collar 144, a second sleeve 145, and the hub 17 of the gear wheel 12. These parts are held in fixed position longitudinally of the shaft 4 by means of a nut 146, by which they are movable along the sleeve 141 until the collar 142 is locked against the projecting flange at the upper end of the sleeve 141. The hub 17 of the gear wheel 12 is keyed to the shaft 4, preferably by a number of longitudinally arranged keys arranged around the shaft 4, as shown at 146'. A thrust bearing, comprising an upper ball race 147, a lower ball race 148 and a series of intervening balls 149, is arranged between the collars 142 and 144; and a ball bearing, comprising an outer ball race 150, an inner ball race 151 and a series of balls 152 interposed between said ball races, is arranged between the collar 144 and the hub 17 of the gear 12. This last-named ball bearing is designed to hold the shaft 4 in proper coaxial relation to the tubular frame member 5 and to permit the free rotation of the shaft 4 within the said member. The two ball bearings just described are inclosed within a casing 153, which, as shown, extends downwardly from and is integral with a sleeve 154 secured to the lower end of the member 5. The lower end of the casing 153 is closed, as by a plate 155, which is bolted or otherwise secured to the body of the casing 153.

The upward thrust of the propeller 2 is transmitted through the shaft 4, the hub 17 of the gear 12, the sleeve 145, the collar 144, the thrust bearing 148, 149, 147, to the upper outer end portion of the casing 153. The thrust bearing 147, 148, 149 has a slight play between the collars 144 and 142, so that, when the upper ball race 147 engages the casing 153, it will not be held tightly against the collar 142 so as to bind the shaft 4, it being understood that the collar 142 rotates with the shaft 4 while the upper ball race 147 is stationary.

When the machine rests upon the ground, the weight of the propellers and propeller shafts is transmitted to the frame through the projection at the upper end of the sleeve 141, the collar 142, the thrust bearing 147, 149, 148, the ring 155', and the outer ball race member 150, to the part 155 of the frame. The inner ball race member 151 has a slight play between the collar 144 and the hub 17 of the gear 12, so that when there is downward thrust due to the weight of the propeller and its shaft it will not be forced into binding engagement with the stationary plate 155. It will be seen that the bearings just described not only tend to hold the shaft 4 in proper relation to its support and permit free rotation thereof, but they also take the upward pull of the rotating propeller and the downward thrust or weight of the stationary propeller and its shaft without causing binding upon either of the bearings.

The bearings for holding the lower end of the inner shaft 3 in proper position in the supporting frame and for taking the lift of the upper propeller or the weight of the propeller and its shaft are similar to those just described in connection with the outer shaft 4. Referring to Fig. 3, the supporting frame has a portion 158, which incloses a thrust bearing 159 and a bearing 160 for holding the lower end of the shaft 3 in proper position in its bearing and permitting free rotation thereof. The casing 158 is provided with a plate 161 for closing the upper end thereof and corresponding in function to the plate 155 of the bearing previously described. The shaft 3 has secured to the lower end thereof a sleeve 162, on which are secured, in the order named, the hub 17 of the gear 14, a sleeve 163, collar 164, sleeve 165, and collar 166, these parts being held in proper relation longitudinally of the sleeve 162 by means of a nut 167. A ring 168 surrounds the collar 164 and is arranged between the bearings 159 and 160. The operation of these parts is thought to be evident from the description of the operation of the bearings described in connection with the lower end of the shaft 4.

I shall now describe the mounting of the propeller blades 27 upon the arm 26.

Figure 14:
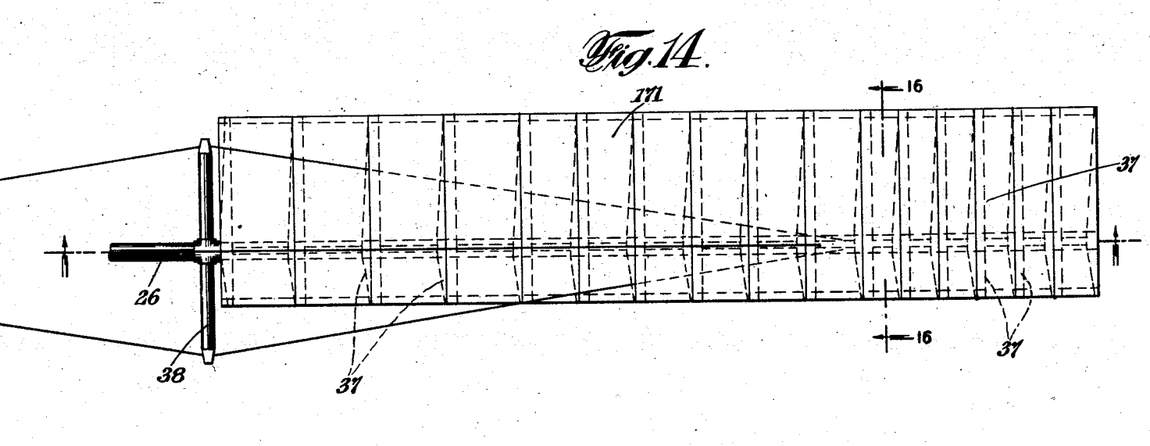
Fig. 14 is a plan view of a propeller blade.

Referring to Figs. 14 to 19, inclusive, each arm 26 has mounted thereon a plurality of cross-braces or ribs 37, to which the covering, comprising the upper wall 171 and lower wall 172 of sheet material, such as aluminum, is secured, as by riveting, so as to leave the outer surfaces smooth. As shown in Fig. 14, the spacing between these cross-braces or ribs 37 decreases from the inner to the outer end of the blade, in order that the blade may have more rigidity and strength toward its outer end, where the thrust thereon is greatest. Each of the cross-braces, as shown, is formed of sheet metal such as aluminum, and comprises a vertical body portion 173, from the upper and lower edges of which extend integral flanges 174 and 175, respectively, the cross-braces or ribs being thus channel-shaped in cross-section. The covering sheets for the blades bear against and are secured to the flanges 174 and 175 as by riveting. Each crossbrace or rib, as shown, is also provided with a cylindrical flange 176 surrounding the hole through which the arm 26 extends, the flange 176 resting against the outer surface of the said arm. I do not claim the flange 176 as my invention. The cross-braces are secured to the tubular arm 26, as by riveting passing through the flange 176 and the arm 26.

Figure 17:
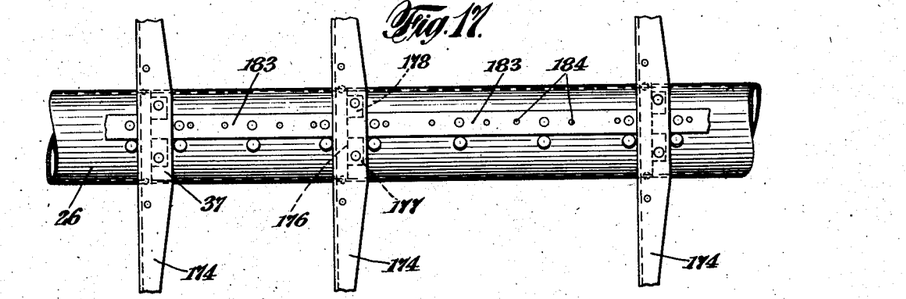
Fig. 17 is a fragmentary plan view, on a larger scale, of the propeller blade supporting arm and the cross-ribs or braces of the propeller blade.
Figure 18:
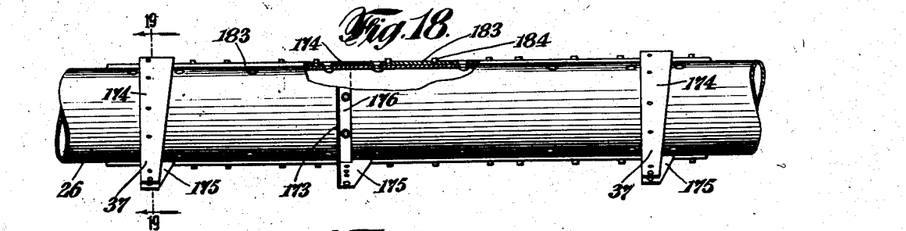
Fig. 18 is an elevation partly broken away of the parts shown in Fig. 17.
Figure 19:
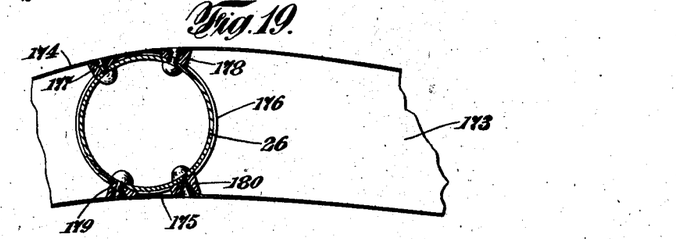
Fig. 19 is a detailed sectional view taken on line 19—19 of Fig. 18.

Referring to Figs. 17 and 19, wedge-shaped blocks 177 and 178 of rigid material, such as aluminum, are arranged between the flanges 174 and the tube 26, respectively, on opposite sides of a vertical center line passing through the arm 26, and rivets extend through the flange 174, the blocks 177 and 178, respectively, and the tubular arm 26. The blocks 177 and 178 are provided with counter-sunk openings, in which the outer heads of the rivets and the parts of the flange 174 engaged thereby are arranged, so as to avoid projecting parts interfering with the placing of the covering upon the cross-ribs or braces. A pair of blocks 179 and 180 are arranged between the flange 175 and the tube 26, and rivets pass through the flange 175, blocks 179 and 180, and the tubular arm 26, with their outer heads and the portions of the flange 175 engaged thereby arranged within countersunk openings in the blocks 179 and 180.

Figure 16:
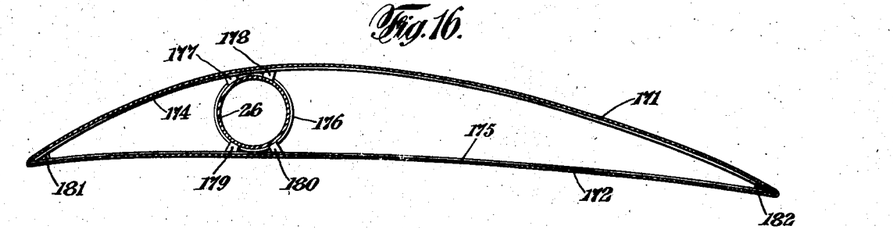
Fig. 16 is a cross-section taken on line 16—16 of Fig. 14.

Referring to Fig. 16, the forward ends of the cross-braces or ribs are connected by a strip 181 of suitable material, such as aluminum, and the rear ends of the cross-braces or ribs are connected by a strip 182 of similar material. The upper and lower surfaces of these strips 181 and 182 are inclined to each other, so that they will extend in a substantially continuous curve with the upper and lower flanges of the cross-brace. To facilitate securing the covering in place, I secure to the upper and lower surface portions of the tube 26 and between the respective cross-braces or ribs longitudinal metallic strips 183, between which and the tube 26 the inner heads of rivets 184 are held, these rivets projecting through the strips 183 and being adapted to pass through the covering 171 and 172 and riveted thereto so as to provide a smooth outer surface for the blade. The forward edges of the covering sheets 171 and 172 are secured to the strip 181, and the rear edges of said sheets are secured to the strip 182. The centrifugal force tending to move the ends of the cross-braces away from the axis of rotation of the propeller is transmitted by the covering sheets to the tube 26, and the said ends are accordingly firmly held in place against the action of said force.

Referring to Fig. 16, it will be seen that the propeller blade has in cross-section a rigid aeroform shape. The upper and lower surfaces of the blade are of different curvature and cross-section, and a lifting force is exerted upon the blade at both of these surfaces. Such shapes have been studied in connection with aeroplane wings, are well known to those skilled in the art, and are referred to in various treatises; for example the authoritative book: "*The Resistance of the Air and Aviation*" by Eiffel. It has been found that the lifting force with wings of this shape is greater upon the upper surface than upon the lower surface. The wing shown is No. 63 in said book.

The propeller blade is supported, in accordance with my invention, so that the center of the support of the blade transversely to its length is forwardly of the center of air pressure upon the blade. The location of the center of air pressure and lift depends upon the various factors, including the shape of the blade and the pitch angle thereof, and may be a substantial distance forwardly of the center of the blade. For a blade of the shape shown and supported as shown, the center of pressure will be between the longitudinal center line of the blade and the axis of the tube 26, and closer to the latter than to the former. In other words, the axis of the tube 26 or the center of transverse support, and also the center of transverse strength of the propeller blade, which is substantially coincident with the axis of the tube 26, is forwardly of the center of pressure, which center of pressure is usually about 20% to 33% of the width of the blade rearwardly from the front edge thereof. As a result, the blade is pulled around by the supporting arm, instead of being pushed, and danger of chattering of the blade is obviated. Furthermore, with the blade construction and mounting herein described, there may be sufficient give or yield in the blade to permit of automatic variation of the pitch thereof by the air pressure within desired limits and such variation may be useful for the following reasons. The speed of rotation of the propellers varies greatly in starting or rising, in descending or landing and in the various conditions of flight, and also depends upon the action of the motors, quantity and quality of fuel, etc. The greater this speed the smaller the pitch angle to give the upward thrust required to lift and support the machine. It is most desirable therefore to have the pitch angle adjust itself automatically to the varying speed and working conditions.

It is generally desirable not only for the pitch of the propellers to be adjusted with respect to their lift but also with respect to their drag or the torque required to rotate them. At a moderate speed a considerable pitch angle may not involve excessive drag or torque. At a high speed, however, the drag and torque may become greater than is necessary to produce the desired action or greater than the strength and proper action of the parts will safely permit. In the present invention the automatic variation of the pitch angle takes place as required by these conditions.

The steering means for the machine are shown only in a very general way, these means being described in full and claimed in another application filed on even date herewith.

For turning the machine about the axis of the shafts 3 and 4, so as to enable it to face in different directions, I provide planes 200 and 201 (see Fig. 1), located at the extremities of the arms 125 and 126, respectively. These planes are capable of being tilted about a horizontal axis passing through their centers and are located below the propeller blades, so as to receive the down-draft therefrom when the propellers are rotating. When it is desired to turn the machine about the axis of the shafts 3 and 4, the planes 200 and 201 are tilted in opposite directions away from their normal vertical positions. The result is that the down-draft from the propeller blades, the propellers rotating, tends to cause the plane 200 to move in one direction and the plane 201 to move in the opposite direction, thereby producing a dynamic couple, which tends to rotate the machine as desired. As soon as the machine has been rotated to the desired position, the planes 200 and 201 are returned by the operator to normal vertical position.

These planes may be used to correct any tendency of the body to rotate due to unequal action of the propellers. They may also be arranged so as to be rotatable about vertical axes 200' and 201', so as to be capable of being used like rudders to balance unequal effort of the propellers tending to turn the machine when it is in horizontal movement or of being used to turn the machine when it is moving horizontally.

In case it is desired to tilt the machine so as to produce lateral motion thereof, one only of the planes 200 and 201 is moved to horizontal position, the other remaining vertical, whereupon the down draft from the rotating propellers forces this plane downwardly and tilts the machine.

Independent means are desirably provided for maintaining the machine tilted after it has begun its movement laterally. The means, as shown, comprise planes 202 and 203 carried by the arms 125 and 126, respectively, and rotatable about horizontal axis transverse to said arms. These planes are located inwardly of the inner edges of the propeller blades and do not receive any down draft therefrom. By inclining them in opposite directions, as shown, the air will, if the machine moves forwardly in the direction of the arrow, press against the upper surface of the plane 203 and the lower surface of the plane 202, thereby producing a dynamic couple tending to maintain the machine tilted against its tendency to right itself. The steering means herein described are claimed and more fully shown in another application filed on even date herewith.

The machine may be made of very strong material, and except for the propeller blades is desirably made of steel, the propeller blades being preferably made of aluminum. They may, however, also be made of steel or other suitable material. Propellers may be made in accordance with my invention of greater strength than but of a weight ½ or less of the weight of the present accepted propeller construction.

It is to be understood that I am not to be limited to the specific features of construction and arrangement which I have illustrated and described, as these might be departed from while still employing my invention as set forth in the appended claims.

What I claim as new and desire to secure by Letters Patent, is:

1. A propeller blade of aeroform shape having throughout its length its greatest transverse strength and its center of transverse support forwardly of the center of pressure upon the blade.

2. A propeller blade of aeroform shape having its center of strength and center of support forwardly of the center of pressure upon the blade, said blade being yieldable to vary the pitch angle thereof.

3. A helicopter having propellers rotating in opposite directions about a common axis, said propellers having blades of aeroform shape, the center of support and the center of strength of the respective blades being forwardly of the center of pressure upon the respective blades and a substantial distance rearwardly of the forward edges of the respective blades.

4. A propeller comprising an arm of uniform cross section, cross braces of sheet material mounted upon said arm at different points in the length thereof and supported solely thereby, said braces having integral flanges at the outer edges thereof and said arm passing through said braces, and an outer covering of sheet material bearing against said flanges.

5. A propeller comprising a tubular arm, cross braces of sheet material mounted upon said arm at different points in the length thereof and having flanges at the outer edges thereof, said arm passing through said braces, and an outer covering of sheet material secured to said flanges.

6. A propeller comprising a tubular arm, cross braces of sheet material mounted upon said arm at different points in the length thereof and having flanges at the outer edges thereof, said arm passing through said braces, strengthening means between the respective flanges and said arm, and an outer covering of sheet material bearing against said flanges.

7. A propeller comprising an arm of uniform cross section, cross braces of sheet material mounted upon said arm at different points in the length thereof and supported solely thereby, said braces having integral flanges at the outer edges thereof and said arm passing through said braces, and an outer covering of sheet material bearing against said flanges, the outer braces being arranged more closely together than the inner braces.

8. A propeller comprising an arm, cross braces of sheet material mounted upon said arm and having flanges at the outer edges thereof, strengthening blocks between the respective flanges and said arm, and an outer covering of sheet material bearing against said flanges.

9. A propeller comprising a tubular arm, cross-braces of sheet metal mounted upon said arm and having integral flanges at the outer edges thereof, a strengthening block between the said arm and each of the first named flanges, and an outer covering of sheet material secured to said first named flanges.

10. A propeller blade comprising a frame, a covering of sheet material thereon, and means for securing said covering to said frame comprising headed fastenings, said frame having superposed members between which a head of each fastening is secured.

11. The combination of a shaft, a propeller blade, a supporting arm for said blade connected to and extending outwardly from said shaft, said blade comprising cross braces supported by said arm and a covering for said braces, an arm projecting from said shaft at an angle to said supporting arm, and means connected with said arms to hold the said blade against displacement relatively to said shaft in the plane in which said blade is movable by said shaft, said second arm having greater rigidity in said plane than said supporting arm.

12. The combination of a shaft, a propeller blade, a supporting arm for said blade connected to and extending outwardly from said shaft, said blade comprising cross braces supported by said arm and a covering for said braces, an arm projecting forwardly from said shaft at an angle to said supporting arm, and tension means connected with said arms to hold the said blade against displacement relatively to said shaft in the plane in which said blade is movable by said shaft, said second arm having greater rigidity in said plane than said supporting arm.

13. The combination of a shaft, propeller blades extending outwardly from said shaft respectively on opposite sides thereof, and means for connecting said blades and shaft to permit the latter to move the former, said means including an arm supporting each of said blades from said shaft, each of said blades comprising cross braces carried by a supporting arm and a covering for said braces, arms projecting forwardly from said shaft at an angle to said supporting arms, and tension means connected with said second named arms and with said supporting arms for holding the latter against displacement relatively to said shaft substantially in the plane in which said blades are movable by said shaft, said second named arms having greater rigidity in said plane than said supporting arms.

14. The combination of a shaft, propeller blades extending outwardly from said shaft respectively on opposite sides thereof and means connecting said blades and shaft to permit the latter to move the former, said means including an arm supporting each of said blades from said shaft, each of said blades comprising cross braces carried by a supporting arm and a covering for said braces, arms projecting in opposite directions from said shaft at an angle to said supporting arms, and tension means connecting each of said second named arms with both of said supporting arms for holding the latter against displacement relatively to said shaft substantially in the plane in which said blades are movable by said shaft, said second named arms having greater rigidity in said plane than said supporting arms.

15. The combination of a shaft, a propeller blade extending outwardly from said shaft, and means connecting said blade and shaft to permit the latter to move the former, said means comprising a truss connected with said blade and shaft and rigid substantially in the plane in which said blade is movable by said shaft, the outer rigid end of the truss being connected to the blade at a point such that the drags on the propeller blades outwardly and inwardly of the point are substantially equal, and means connecting said shaft and truss for holding said truss and blade against displacement relative to said shaft substantially in the aforesaid plane.

16. The combination of a shaft, a propeller blade extending outwardly from said shaft and arranged with its inner edge spaced from said shaft, and means connecting said blade and shaft to permit the latter to move the former, said means comprising a truss connected with said blade and shaft and rigid substantially in the plane in which said blade is movable by said shaft, and means connecting said shaft and truss for holding said truss and blade against displacement relative to said shaft substantially in the aforesaid plane, said connecting means being connected to said truss exteriorly of said blade and said blade being adjustable to change the pitch angle thereof.

17. The combination of a shaft, a propeller blade extending outwardly from said shaft, and means connecting said blade and shaft to permit the latter to move the former, said means comprising a truss connected with said blade and shaft and rigid substantially in the plane in which said blade is movable by said shaft, the outer rigid end of the truss being connected to the blade at a point such that the drags on the propeller blades outwardly and inwardly of the point are substantially equal, a rigid arm projecting forwardly from said shaft at an angle to the length of the blade, and tension means connecting said arm and truss to hold said truss and blade against displacement relatively to said shaft substantially in the plane in which said blade is movable by said shaft.

18. The combination of a shaft, a propeller blade extending outwardly from said shaft, and means connecting said blade and shaft to permit the latter to move the former, said means comprising a truss connected with said blade and shaft and rigid substantially in the plane in which said blade is movable by said shaft, and means connecting said shaft and truss for holding said truss and blade against displacement relative to said shaft substantially in the aforesaid plane, said truss comprising a compression member connected with said shaft and blade, a second compression member projecting from said first-named compression member and tension means connecting said compression members.

19. The combination of a shaft, a propeller blade extending outwardly from said shaft and means connecting said blade and shaft to permit the latter to move the former, said means comprising a truss connected with said blade and shaft and rigid substantially in the plane in which said blade is movable by said shaft, a rigid arm projecting forwardly from said shaft at an angle to said blade and tension means connecting said arm and truss for holding said truss and blade against displacement relatively to said shaft substantially in the plane in which said blade is movable by said shaft, said truss comprising a compression member connected with said shaft and blade, a second compression member projecting from said first-named member and tension means connecting said compression members.

20. In a helicopter, the combination of a shaft, arms projecting therefrom, propeller blades carried by said arms respectively, and means comprising members carried by each of said arms between the outer ends thereof and said shaft to resist flexing of said arms substantially in the plane of movement of said blades, each of said arms being adjustably connected to said shaft to permit variation of the pitch of the respective blade.

21. In a helicopter, the combination of a plurality of members and means for holding one of the said members in position with respect to the other, including a guy, means fitting within and extending longitudinally of one of said members and to the side of which said guy is secured, said last named means being designed to distribute the tension of said guy over an area of said member materially larger than the cross-section of said guy and to apply the same over an area extending longitudinally of said member, and means for securing said guy to the other member.

22. In a helicopter, the combination of a plurality of members and means for holding one of the said members in position with respect to the other, including a guy, a rigid anchor block fitting within and secured to one of said members and tending to hold the same against collapsing, said guy being secured to said block, and means for securing said guy to the other member.

23. In a helicopter, the combination of a plurality of members and means for holding one of the said members in position with respect to the other, including a guy, means secured to one of said members at a considerable number of points covering an area of considerable extent and to which said guy is secured, said last named means being designed to distribute the tension of said guy over an area of said member materially larger than the cross-section of said guy, and means for securing said guy to the other member.

24. In a helicopter, the combination of a plurality of members and means for holding one of said members in position with respect to the other, including a guy, means fitting within one of said members and to which said guy is secured, said last named means comprising a device having a surface of considerable extent in engagement with said member and secured thereto at a considerable number of points, and means for securing the guy to the other member.

25. In a helicopter, the combination of a plurality of members and means for holding one of the said members in position with respect to the other, including a guy, means fitting within one of said members and to which said guy is secured, said last named means comprising a device having a surface of considerable extent in engagement with said member, a considerable number of pins for securing said device to said member, and means for securing the guy to the other member.

26. In a helicopter, the combination of propellers, one arranged above the other, means supporting said propellers for rotation about a common axis, said supporting means including a member arranged to take stress from both propellers when the propellers are subjected to a thrust tending to move the same out of axial alinement, said member being reinforced at that part thereof where such stress is greatest.

27. In a helicopter, the combination of propellers, one arranged above the other, means supporting said propellers for rotating about a common axis, means for rotating the same in opposite directions, said supporting means including a member arranged to take stress from both propellers when the propellers are subjected to a thrust tending to move the same out of axial alinement, said member being reinforced at that part thereof where such stress is greatest.

28. In a helicopter, the combination of propellers, one of which is arranged above the other, means for supporting said propellers for rotation about a common axis, means for rotating said propellers in opposite directions, and means for causing the propellers to be inclined from the horizontal to cause the helicopter to move laterally, said supporting means including a shaft arranged to take stress from both propellers when the propellers are subjected to a thrust arising from said inclination, said shaft being reinforced between the propellers against such stress.

29. In a helicopter, the combination of propellers, one arranged above the other, an inner tubular shaft supporting the upper propeller, a tubular shaft rotatable upon said inner shaft and supporting the lower propeller, said inner shaft being of increasing thickness toward a point between said propellers.

30. In a device of the class described, the combination of a plurality of shafts having a common axis of rotation, one of said shafts surrounding the other, bearings between said shafts, a support for said shafts, and separate means for transmitting to said support the thrust or pull of each shaft in both directions axially of the shafts.

31. In a device of the class described, the combination of a plurality of shafts having a common axis of rotation, one of said shafts surrounding but being spaced from the other, antifriction bearings between said shafts, a support for said shafts, and separate antifriction bearings for transmitting to said support the thrust or pull of each shaft in both directions axially of the shafts.

32. In a device of the class described, the combination of a plurality of shafts having a common axis of rotation, a support for said shafts, bearings for preventing movement of the said shafts with respect to said support transversely to their axis, and a separate bearing for transmitting to said support the thrust or pull of each of the said shafts in both of the two opposite directions axially of the shaft.

33. In a device of the class described, the combination of a plurality of shafts having a common axis of rotation, a support for said shafts, antifriction bearings for preventing movement of the said shafts with respect to said support transversely to their axis, and a separate antifriction bearing for transmitting to said support the thrust or pull of each of the said shafts in both of the two opposite directions axially of the shaft.

34. In a device of the class described, the combination of a shaft, a support therefor, a bearing for preventing movement of said shaft with respect to said support transversely of the axis of said shaft, and a bearing for transmitting the thrust or pull of said shaft from a portion of the said shaft on one side of said first named bearing, to a portion of the said support on the opposite side of said first named bearing, without binding said first named bearing.

35. In a device of the class described, the combination of a shaft, a support therefor, an antifriction bearing for preventing movement of said shaft with respect to said support transversely of the axis of said shaft, and an antifriction bearing for transmitting the thrust or pull of said shaft in opposite directions from a portion of the said shaft on one side of said first named bearing to a portion of the said support on the opposite side of said first named bearing without binding said bearings.

36. In a device of the class described, the combination of a plurality of shafts having a common axis of rotation, one of said shafts surrounding the other, a propeller carried by each of said shafts, bearings between said shafts, a support for said shafts, and separate means for transmitting to said support the thrust or pull of each shaft in both directions axially of the shafts.

37. In a device of the class described, the combination of a plurality of shafts having a common axis of rotation, a support for said shafts, a propeller carried by each of said shafts, antifriction bearings for preventing movement of the said shafts with respect to said support transversely to their axis, a separate antifriction bearing for transmitting to said support the thrust or pull of each of the said shafts in both of the two opposite directions axially of the shafts, and means for rotating said shafts in opposite directions.

38. In a device of the class described, the combination of a shaft, a support therefor, an antifriction bearing for preventing movement of said shaft with respect to said support transversely of the axis of said shaft, and an anti-friction bearing for transmitting the thrust or pull of said shaft in opposite directions from a portion of the said shaft on one side of said first named bearing to a portion of the said support on the opposite side of said first named bearing without binding said bearings, the thrust or pull of said shaft in one direction being transmitted through said second named antifriction bearing over a different path from the thrust or pull of the shaft in the opposite direction.

39. In a device of the class described, the combination of a plurality of shafts having a common axis of rotation, a support for said shafts, a propeller carried by each of said shafts, antifriction bearings for preventing movement of the said shafts with respect to said support transversely to their axis, an antifriction bearing for transmitting to said support the thrust or pull of each of the said shafts in both of the two opposite directions axially of the shafts, the thrust or pull in one direction being over a different path from the thrust or pull in the opposite direction, and means for rotating said shafts in opposite directions.

40. In a helicopter, the combination of superposed propellers each over 40 feet in diameter, driving means, speed reducing means between said driving means and propellers, coaxial shafts by which said propellers are respectively supported, the inner shaft projecting above the outer shaft and carrying the upper propeller, the inner shaft being strengthened at the upper end of the outer shaft to take the stress thereon when the machine is supported by one blade only of each of the propellers and such blades are pointing in opposite directions from the axis of rotation of the propellers, and a bearing between said shafts.

In testimony whereof, I have signed my name to this specification.

PETER COOPER HEWITT.